United States Patent
Ahsanuzzaman et al.

(10) Patent No.: US 10,381,936 B2
(45) Date of Patent: Aug. 13, 2019

(54) FLYBACK CONVERTER

(71) Applicant: Silanna Asia Pte Ltd, Singapore (SG)

(72) Inventors: Sheikh Mohammad Ahsanuzzaman, Scarborough (CA); Seyed-Behzad Mahdavikhah-Mehrabad, Toronto (CA); Aleksandar Radic, Pitt Meadows (CA); Aleksandar Prodic, Toronto (CA)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 15/539,431

(22) PCT Filed: Nov. 30, 2015

(86) PCT No.: PCT/CA2015/000587
§ 371 (c)(1),
(2) Date: Jun. 23, 2017

(87) PCT Pub. No.: WO2016/101058
PCT Pub. Date: Jun. 30, 2016

(65) Prior Publication Data
US 2018/0269793 A1 Sep. 20, 2018

Related U.S. Application Data

(60) Provisional application No. 62/096,322, filed on Dec. 23, 2014.

(51) Int. Cl.
*H02M 3/335* (2006.01)
*H02M 1/32* (2007.01)
(Continued)

(52) U.S. Cl.
CPC ......... *H02M 3/33569* (2013.01); *H02M 1/08* (2013.01); *H02M 1/32* (2013.01);
(Continued)

(58) Field of Classification Search
CPC .... H02M 3/1584; H02M 3/285; H02M 3/335; H02M 3/33507; H02M 3/33515;
(Continued)

(56) References Cited

U.S. PATENT DOCUMENTS 9,577,540 B1 *    2/2017    Xiong .................. H02M 3/3353
2003/0001544 A1 * 1/2003    Nakanishi ............. H02J 7/0047
                                                            320/162
(Continued)

FOREIGN PATENT DOCUMENTS

| EP | 2063523 | 5/2009 |
|---|---|---|
| JP | S62210861 A | 9/1987 |
| JP | 2008187817 A | 8/2008 |

OTHER PUBLICATIONS

International Search Report and Written Opinion dated Feb. 15, 2016 for corresponding PCT Patent Application No. PCT/CA2015/000587.
(Continued)

*Primary Examiner* — Gary L Laxton
*Assistant Examiner* — Ivan Laboy
(74) *Attorney, Agent, or Firm* — MLO, a professional corp.

(57) ABSTRACT

The flyback converter generally has a capacitive divider operatively connectable to a voltage source for receiving an input voltage, the capacitive divider having a plurality of capacitive devices connected in series from one another; a transformer having a plurality of primary windings inductively coupled to at least one secondary winding, each one of the primary windings of the transformer being connected in parallel to a corresponding one of the capacitive devices of the capacitive divider via a switching device, each of the at least one secondary winding being connected to a forwardly biased and capacitive circuit connectable to an output load; and a controller connected to each one of the
(Continued)

switching devices for operating the flyback converter to power the output load with the voltage source.

17 Claims, 15 Drawing Sheets

(51) Int. Cl.
*H02M 1/08* (2006.01)
*H02M 1/42* (2007.01)
*H02M 1/00* (2006.01)
*H02M 1/12* (2006.01)
*H02M 1/34* (2007.01)
*H02M 1/44* (2007.01)

(52) U.S. Cl.
CPC .......... *H02M 3/33523* (2013.01); *H02M 1/12* (2013.01); *H02M 1/34* (2013.01); *H02M 1/4258* (2013.01); *H02M 1/44* (2013.01); *H02M 2001/0009* (2013.01); *H02M 2001/0058* (2013.01); *H02M 2001/0074* (2013.01); *Y02B 70/126* (2013.01)

(58) Field of Classification Search
CPC ......... H02M 3/33523; H02M 3/33538; H02M 3/33546; H02M 3/33553; H02M 3/33576; H02M 3/33584; H02M 3/33592; H02M 2001/007; H02M 2001/0074; H02M 2001/0077; H02M 2001/008; H02M 2001/0083; H02M 2007/4835
USPC ........................................... 363/21.12–21.18
See application file for complete search history.

(56) References Cited

U.S. PATENT DOCUMENTS

| 2005/0139258 A1* | 6/2005 | Liu ........................ H02J 7/35 136/244 |
| 2010/0128505 A1* | 5/2010 | Leppanen .......... G01R 19/0092 363/131 |
| 2011/0194317 A1* | 8/2011 | Truettner .......... H02M 3/33569 363/21.18 |
| 2013/0033197 A1 | 2/2013 | Hwang et al. |
| 2013/0076310 A1* | 3/2013 | Garnier ................ H02J 7/0016 320/118 |
| 2013/0114309 A1* | 5/2013 | Gollob ............... B60L 11/1866 363/21.04 |
| 2013/0286699 A1* | 10/2013 | Lee ...................... H02M 3/335 363/71 |
| 2014/0369093 A1* | 12/2014 | Park ....................... H02M 1/34 363/50 |

OTHER PUBLICATIONS

Cheol O. Yeon et al.; Design of Series Input Parallel Output Interleaved Flyback Converted for 75W AC-DC Adapter; 2012 IEEE Vehicle Power and Propulsion Conference, Oct. 9-12, 2012, Seoul, Korea.
Aleksandar Radic et al.; Low-Volume Stackable Flyback Converted with Near Minimum Deviation Controller, 2014 IEEE.
Aleksandar Radic et al.; High-Power Density Hybrid Converter Topologies for Low-Power Dc-Dc SMPS, The 2014 International Power Electronics Conference, May 18-21, 2014.
European Search Report dated Jun. 11, 2018 for European Patent Application No. 15871377.6.
Office Action dated Feb. 19, 2019 for European Patent Office Application No. 15871377.6.

* cited by examiner

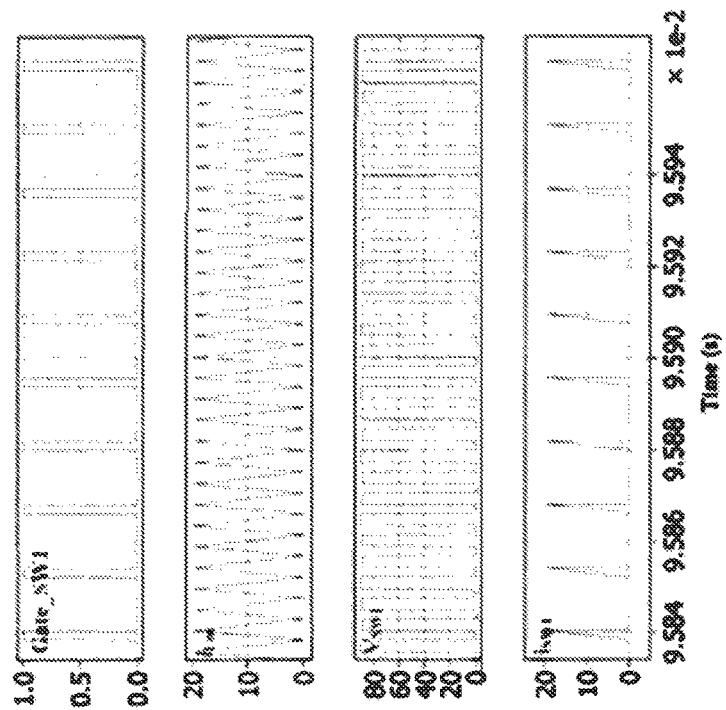
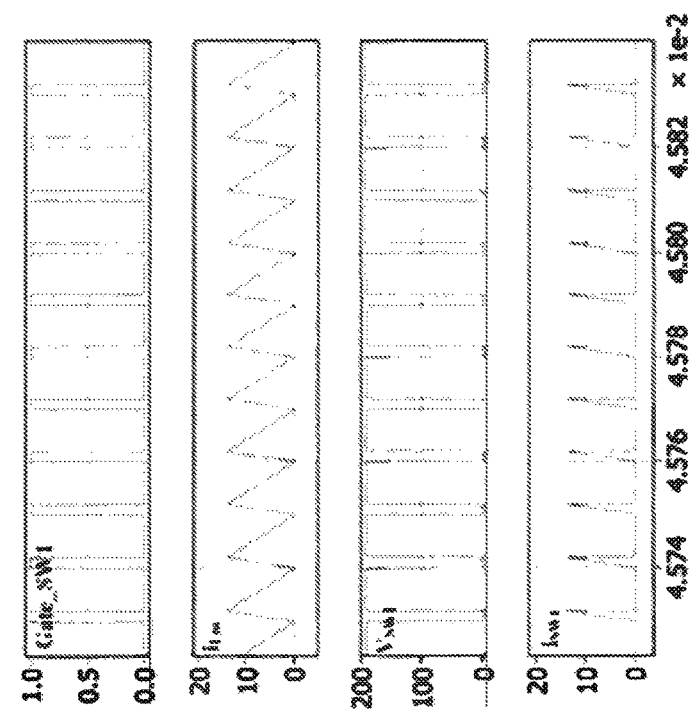
FIG. 9B
FIG. 9A
PRIOR ART

FLYBACK CONVERTER

CROSS-REFERENCE TO RELATED APPLICATIONS

This application is a U.S. nationalization under continuation of 35 U.S.C. § 371 of International PCT Application No. PCT/CA2015/000587 filed Nov. 30, 2015 which claims the benefit of priority under 35 U.S.C. § 119(e) to U.S. Provisional Patent Application No. 62/096,322 filed Dec. 23, 2014.

FIELD

The improvements generally relate to the field of switch-mode power supplies, and more particularly to the field of flyback converters used for providing direct current (DC) from alternating current (AC) or DC voltage sources.

BACKGROUND

Switch-mode power supplies (SMPSs) converting alternating current (AC) to direct current (DC) and/or DC to DC are widely spread in the consumer electronics market. These SMPSs typically provide regulated power to portable and/or stationary electronic devices consuming from several watts up to several hundreds of watts. Among the SMPSs available, flyback converters are appreciated for their enhanced robustness associated with a galvanic isolation between the input and the output of the flyback converter.

Although the conventional flyback converter have many advantages over other types of SMPSs, when the input voltage source has a relatively high voltage, greater restrictions are imposed on the flyback converter components, namely on the voltage switch and the transformer, which tended to limit the use of flyback converter topologies. There thus remained room for improvement.

SUMMARY

There is provided a flyback converter involving a transformer having a plurality of primary windings where each of the primary windings is connected in parallel with a corresponding one of a plurality of capacitive devices. These capacitive devices are provided in the form of a capacitive divider which receives an input voltage from a voltage source. The capacitive divider then divides the input voltage into a plurality of smaller, divided voltages which are provided to each one of the capacitive devices and thus, to the primary windings connected thereto. By dividing the input voltage into a plurality of capacitive devices, the restrictions imposed on each one of the associated switches can be significantly reduced, allowing the use of a plurality of commoditized switches such as metal-oxide-semiconductor field-effect transistors (MOSFETs), for instance, instead of a single higher-voltage switch.

In accordance with one aspect, there is provided a flyback converter comprising: a capacitive divider operatively connectable to a voltage source for receiving an input voltage, the capacitive divider having a plurality of capacitive devices connected in series from one another; a transformer having a plurality of primary windings inductively coupled to at least one secondary winding, each one of the primary windings of the transformer being connected in parallel to a corresponding one of the capacitive devices of the capacitive divider via a switching device, each of the at least one secondary winding being connected to a forwardly biased and capacitive circuit connectable to an output load; and a controller connected to each one of the switching devices for operating the flyback converter to power the output load with the voltage source.

In accordance with another aspect, there is provided a method for operating a flyback converter including a transformer having a plurality of primary windings each being connected in parallel with a corresponding capacitive device of a capacitive divider, the method comprising the steps of: providing an input voltage to the capacitive divider; successively and repeatedly operating each one of the primary windings using a portion of the input voltage via the corresponding capacitive device; and generating an output voltage to an output load of the flyback converter upon said operation.

In accordance with another aspect, there is provided a flyback converter comprising: a capacitive divider operatively connectable to a voltage source for receiving an input voltage, the capacitive divider having a plurality of capacitive devices connected in series from one another to produce a voltage drop across each one of the capacitive devices; a transformer with a plurality of primary transformer windings, and a secondary output winding; a plurality of switches each for selectively interconnecting one of the primary transformer windings with one of the capacitive devices to drive a load connected with the output winding; a control circuit for operating the switches based on current at the switches.

Many further features and combinations thereof concerning the present improvements will appear to those skilled in the art following a reading of the instant disclosure.

DESCRIPTION OF THE FIGURES

In the figures,

FIG. 9A is a graph showing the evolution of a normalized switch gate voltage, a magnetizing inductance current, a switch voltage and a switch current for the conventional flyback converter;

FIG. 9B is a graph showing the evolution of a normalized switch gate voltage, a magnetizing inductance current, a switch voltage and a switch current for the flyback converter of FIG. 7, in accordance with an embodiment;

FIG. 13, in accordance with an embodiment

These drawings depict exemplary embodiments for illustrative purposes, and variations, alternative configurations, alternative components and modifications may be made to these exemplary embodiments.

DETAILED DESCRIPTION

Figure 1:
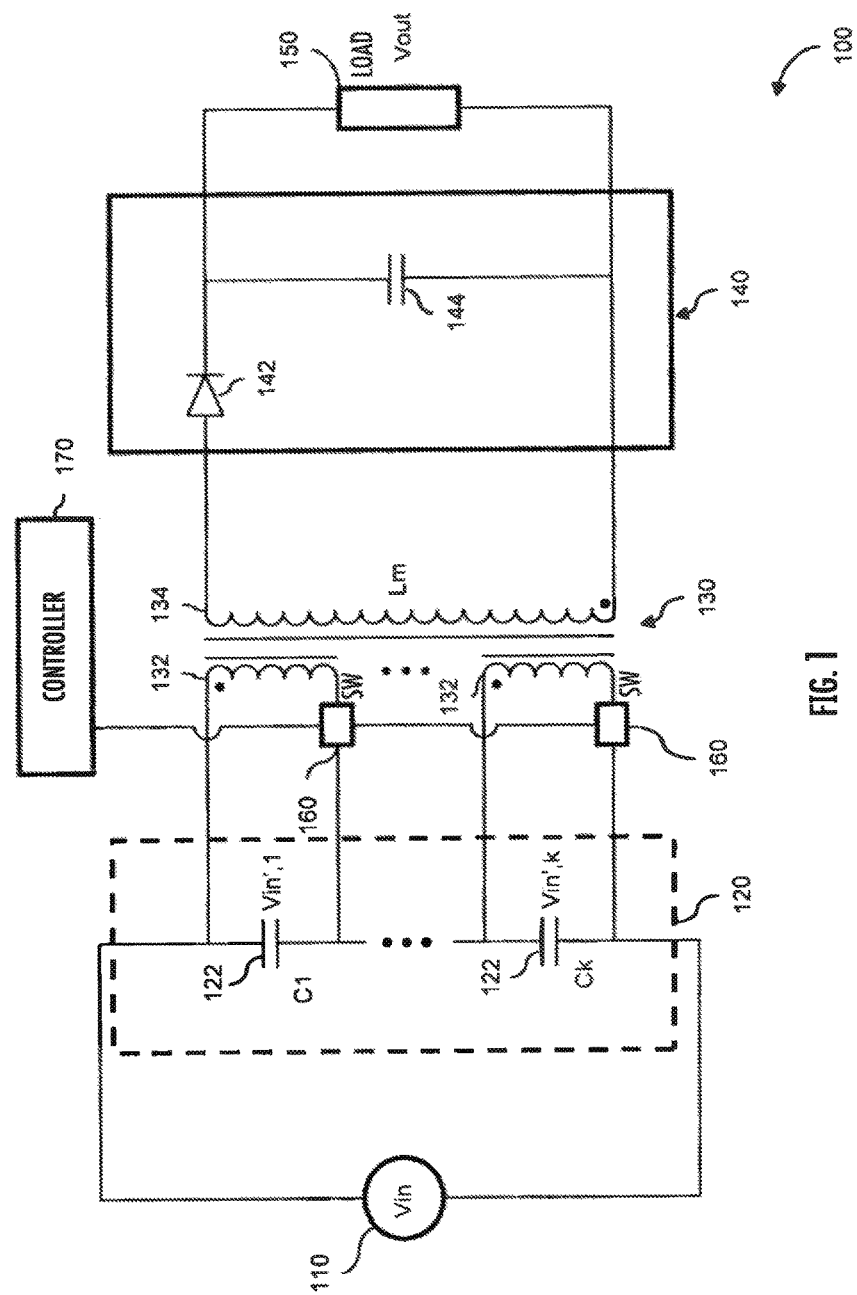
FIG. 1 is a schematic diagram of an example of a flyback converter, in accordance with an embodiment.

FIG. 1 shows an example of a flyback converter 100, in accordance with an embodiment. As depicted, the flyback converter 100 has a voltage source 110 powering the flyback converter 100 with an input voltage Vin. The input voltage can be provided either as an alternating current (AC) or as a direct current (DC), as will be detailed further hereinbelow. The voltage source 110 is connected to a capacitive divider 120 which has a plurality of capacitive devices 122 connected in series from one another for receiving the input voltage Vin. Each one of the capacitive devices 122 has a capacitance value Ck associated thereto, wherein i is a positive integer associated with a corresponding one of the capacitive devices 122. Along the capacitive divider 120, each one of the capacitive devices 122 receives a smaller, divided voltage Vin',k. The flyback converter 100 has a transformer 130 connected to the capacitive divider 120. More specifically, the transformer 130 has a plurality of primary windings 132 inductively coupled to at least one secondary winding 134. The secondary winding 134 is, in turn, connected to a forwardly biased and capacitive circuit 140 in order to provide an output voltage Vout to an output load 150.

Moreover, the flyback converter 100 has a plurality of switching devices 160 connected to each one of the primary windings 132 of the transformer 130. Each one of the switching devices 160 are operatively controlled by a controller 170 for operating the flyback converter successively and repeatedly in on- and off-states during normal use of the flyback converter 100. During normal use of the flyback converter 100, only one switching device 160 is operated at a time, enabling distribution of the power losses over all input stage components and minimization of hot spots, thus reducing cooling requirements. Specifically, the flyback converter 100 is configured to provide the input voltage Vin to the capacitive divider 120; to successively and repeatedly operate, using the switching devices 160, each one of the primary windings 132 using a portion of the input voltage Vin via the corresponding capacitive device 122 in order to generate the output voltage Vout to the output load 150 of the flyback converter 100 upon said operation. It is noted that the operation of the switching device during use of the flyback converter 100 can be performed in any sequential or logical order, for instance.

When one of the switching devices 160 is operated (e.g. closed), the transformer is characterized by a magnetizing inductance value Lm. The magnetizing inductance value Lm may vary depending of which of the switching devices 160 is closed. The switching devices 160 are generally provided in the form of metal-oxide-semiconductor field-effect transistors (MOSFETs) which can manage the smaller, divider voltages Vin',k.

The forwardly biased and capacitive circuit 140 generally has at least a biasing device 142 typically provided in the form of a diode and an output capacitive device 144. During normal use, the flyback converter is adapted to, when operated in the on-state, store energy in a magnetic core 132 of the transformer 130 and then to, when operated in the off-state, deliver the stored energy to both the output capacitive device 144 and the output load 150 via the secondary winding 134. As the capacitive device 144 stores energy from the magnetic core via the secondary winding 134 when operated in the off-state, the flyback converter 100 is also adapted to deliver this stored energy to the output load 150 when it is subsequently operated in the on-state. At this stage, the biasing device 142 helps direct the energy to the output load 150.

In another embodiment, the number of primary windings, i.e. inductance values Lm, differ from a primary winding 132 to another, so that the smaller, divided voltages Vin',k also differ. Typical capacitive values can span from nF to mF range while typical inductance values can span from nH to mH.

The flyback converter 100 can i) reduce the magnitude of the input voltage seen by each individual primary windings 132; ii) reduce the peak magnitude and lower the frequency harmonics of the input current; iii) distribute the input power losses over the multiple primary windings 132 and switching devices 160; iv) achieve passive input capacitor voltage balancing; and v) allow for the use of a single snubber, clamp or soft-switching device 230 to one of the primary and/or secondary windings 132 of the transformer 130.

Figure 2:
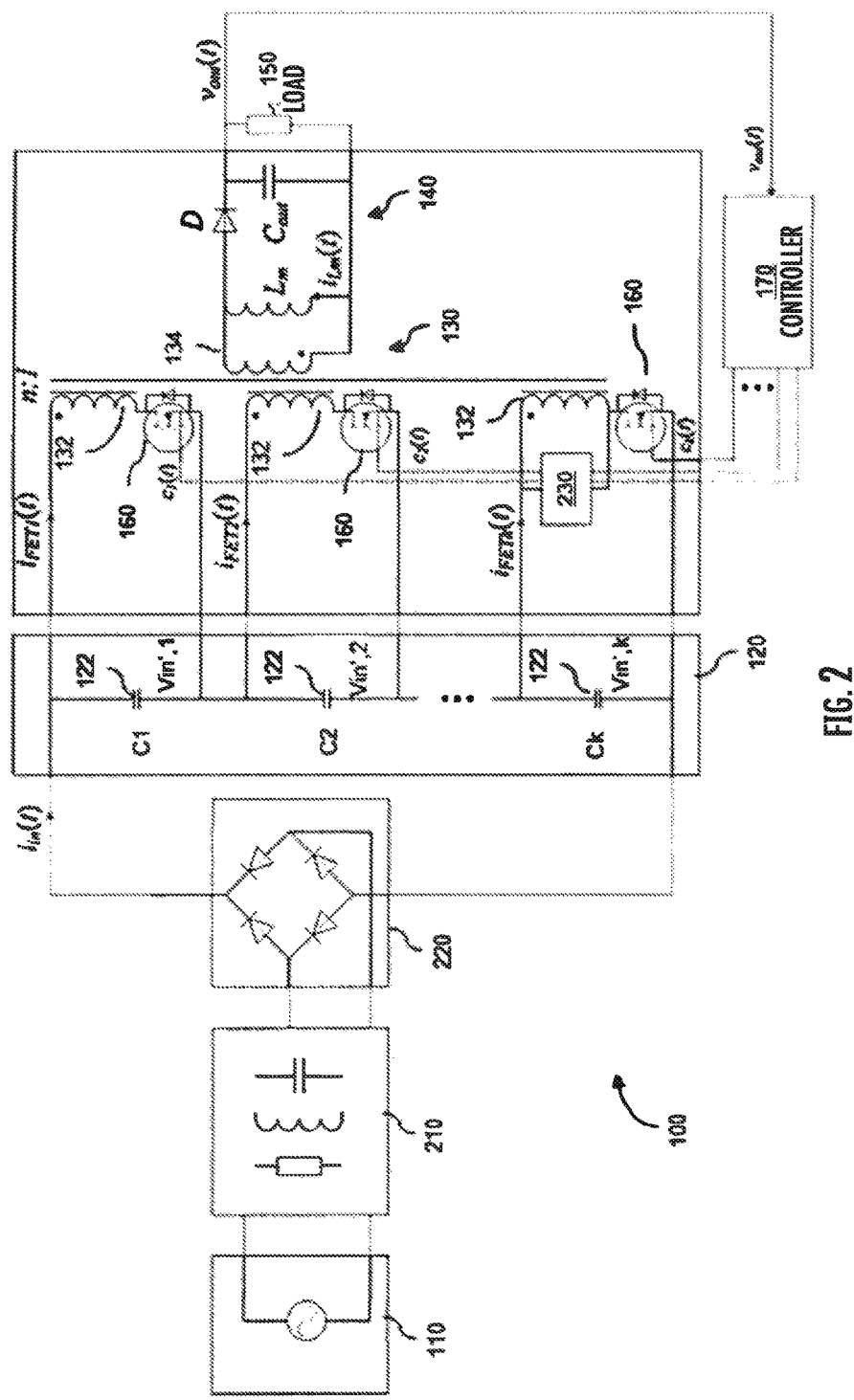
FIG. 2 is a schematic diagram of an example of a flyback converter for converting alternating current (AC) to direct current (DC), in accordance with an embodiment.

FIG. 2 is another example of the flyback converter 100 for converting alternating current (AC) to direct current (DC). As shown, the flyback converter 100 has the voltage source 110 which is adapted, in this example, to provide AC. This specific embodiment has a k number of primary windings 132 and associated capacitive devices 122 and switching devices 160. The flyback converter 100 has an input filter 210 operatively connected to the voltage source 110 for providing a filtered input voltage either directly or indirectly to the capacitive divider 120. In this specific embodiment, the input filter 210 is indirectly connected to the capacitive divider 120 via a rectifier device 220. The rectifier device is generally provided in the form of a diode rectifier in order to rectify the AC provided by the input source 110. Moreover, in this embodiment, a snubber device 230 is provided for reducing a leakage voltage of the flyback converter 100. It is noted that the snubber device 230 is connected to one of the primary windings 132.

Figure 3:
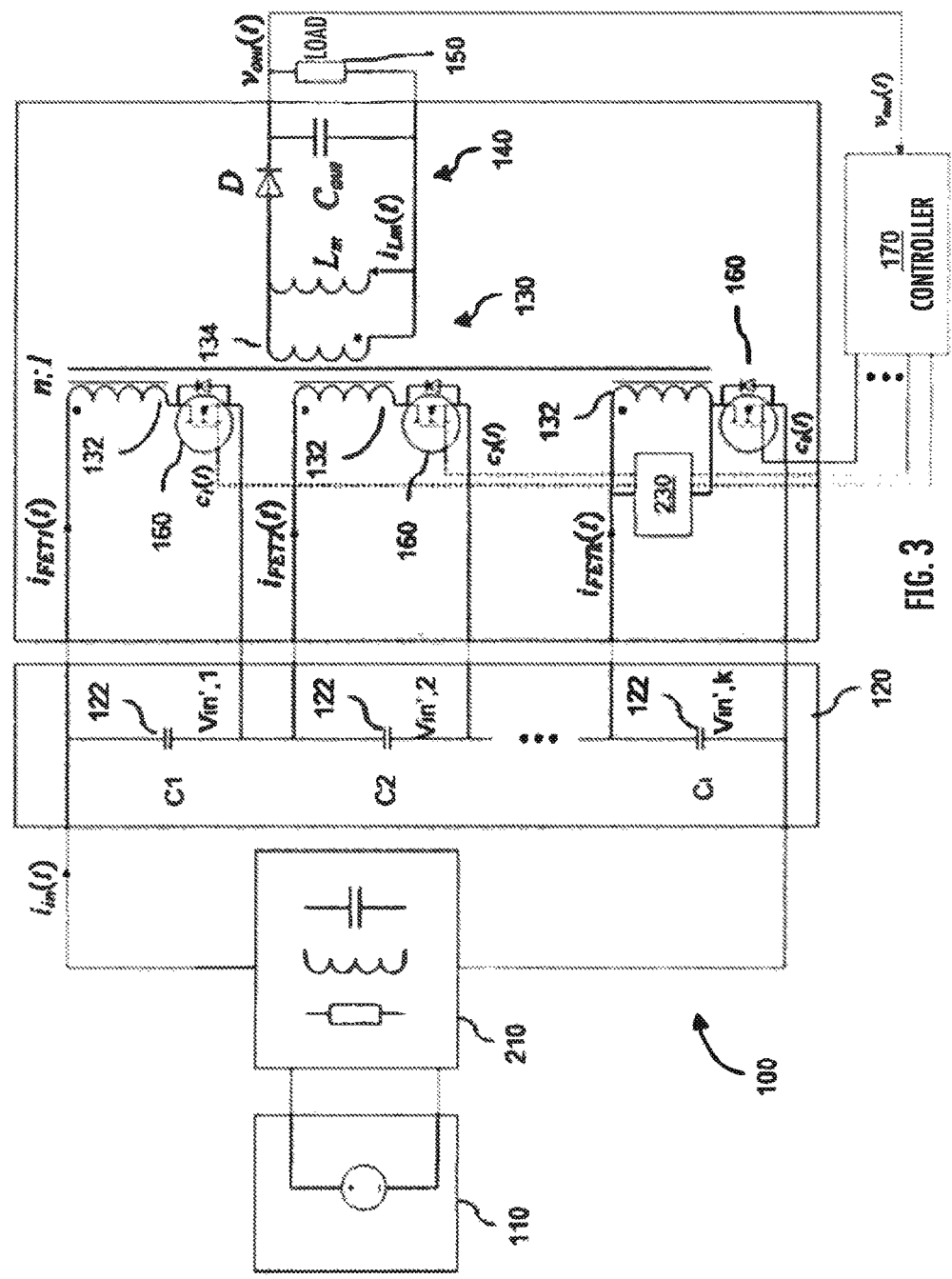
FIG. 3 is a schematic diagram of an example of a flyback converter for converting DC to DC, in accordance with an embodiment.

FIG. 3 is another example of the flyback converter 100 for converting DC to DC. In this specific embodiment, the voltage source 110 is adapted to provide a direct current (DC) to the flyback converter 100. The flyback converter 100 has the input filter 210 to filter the input voltage Vin provided by the voltage source 110.

Figure 4:
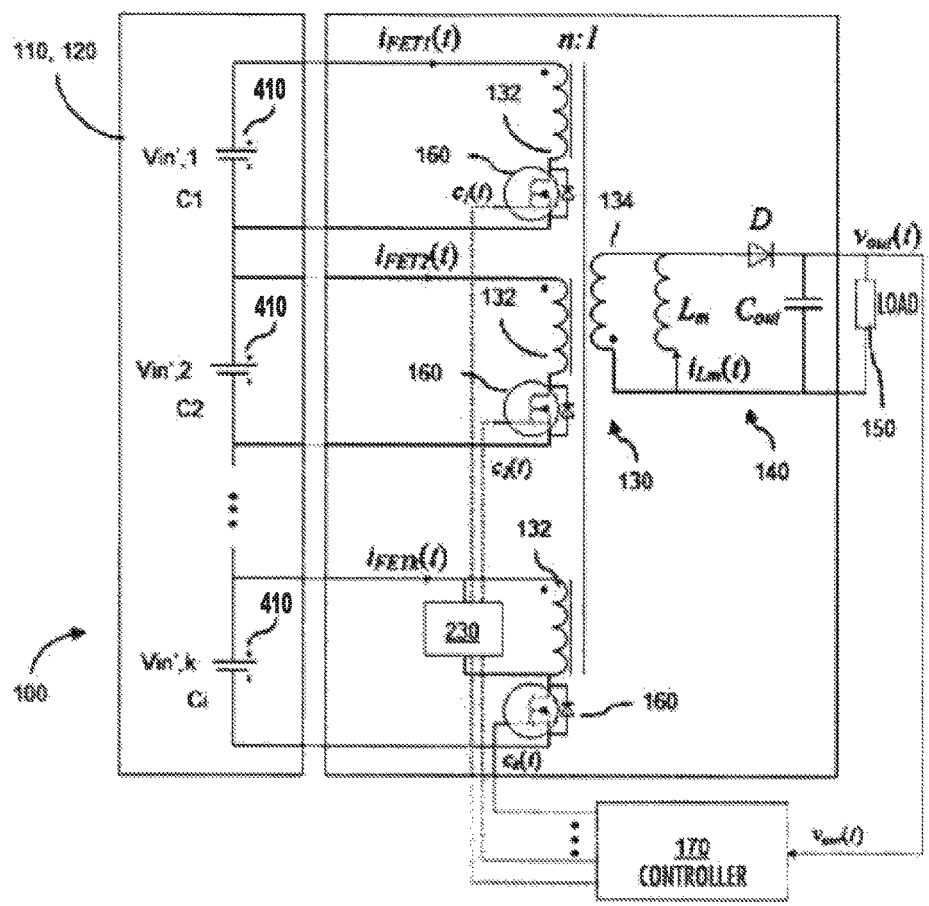
FIG. 4 is a schematic diagram of an example of a flyback converter for converting DC to DC, in accordance with an embodiment.

FIG. 4 is another example of the flyback converter 100 for converting DC to DC. As illustrated, the voltage source 110 is provided in the form of a plurality of batteries 410 connected in series from one another, wherein each one of the capacitive devices 122 of the capacitive divider 120 corresponds to a corresponding one of the plurality of batteries 410.

Due to the smaller, divided input voltages Vin',k, the volume of the transformer 130 of the flyback converter 100 and its power efficiency can be optimized. More specifically, the volume of the transformer 130 can be minimized and the use of "low-voltage" switching devices 160 is allowed. Typically, such low-voltage switching devices 160 can be metal-oxide field effect transistors (MOSFETs), bipolar junction transistors (BJTs), and/or insulated-gate bipolar transistor (IGBTs). The reduced volume of the transformer 130 tends to significantly reduce the volume of the associated flyback converter 100. Moreover, low-voltage MOSFETs 160 are desirable due to their lower switching losses, lower conduction losses and lower cost.

As a result of the reduced magnitude of the peak input current and of the elimination of low-frequency harmonic components, a corner frequency of the electromagnetic interference (EMI) input filter 210 can be increased. Therefore, the volume of reactive components of the EMI filter 210 can be minimized, contributing to further reducing the overall volume of the flyback converter 100.

Due to the topology of the flyback converter 100, passive input capacitor voltage balancing can be obtained. Indeed, when a relatively small capacitor voltage misbalance condition occurs, one or more body diodes of the MOSFETs 160 can become forward biased, thus enabling electric charge to be redistributed from the capacitive device 122 (or the battery 410) with the largest voltage to other capacitive devices 122 (or other batteries 410) with lower voltages. The equivalent circuit formed during the charge distribution is an LC type, consisting of the input capacitances and leakage inductances which greatly limits the peak current magnitude. As a result, a maximum passive operation input voltage misbalance, less than the forward voltage of the body diode of the MOSFET 160 (<1.2 volts usually), can be obtained.

It is noted that the configuration of the transformer 130 allows for the use of a single snubber device 230, generally provided in the form of a passive residual-current device (RCD) or an active clamp snubber, which can reduce the number of components, its complexity and also its cost.

The following paragraphs present some graphs detailing the volume and power processing loss reductions using an AC-to-DC power factor correction (PFC) of the flyback converter 100 operating in critical conduction mode, for instance.

Figure 5A:
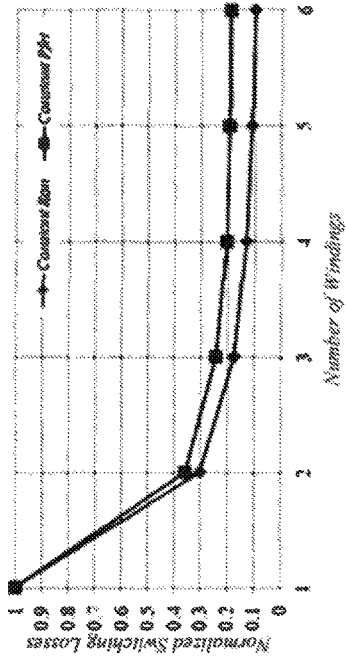
FIG. 5A is a graph of an exemplary curve showing a normalized transformer volume and magnetizing inductance value ($L_m$) as a function of a number of primary windings of a transformer.

For AC-to-DC PFC applications, utilizing constant ton control, the volume VL of the transformer 130 can be given by:

$$V_L = \frac{1}{2} \cdot L_m \cdot I_{peak}^2 \cdot \rho_L = \frac{\pi}{2} \cdot P_{load} \cdot t_{on} \cdot \left(1 + \frac{V_p}{n \cdot k \cdot V_{out}}\right) \cdot \rho_L; \quad (1)$$

where Lm is the magnetizing inductance value, Ipeak is the peak magnetizing current, Pload is the maximum load power, ton is the on-time of each primary side MOSFET 160, Vp is the peak input voltage, k is the number of primary windings 132, n is the transformer conversion ratio, ρL is the inductor energy density and Vout is the output voltage. FIG. 5A is a graph of an exemplary curve showing a normalized inductance volume as a function of the number k of primary windings 132 of the transformer 130. Referring to FIG. 5A, it can be seen that the volume of the transformer 130 and the magnetizing inductance value can be reduced when using a flyback converter 100 having a plurality of primary windings 132, when computed using values associated with typical operating conditions, e.g. Vp=155V, Vout=12V, n=3, ton=constant, Pload=100 W, ρL=constant, and Ron=constant).

As will be described, the on-resistance, Ron, and gate channel charge, Qg, of a MOSFET 160 are two performance metrics which can be used for representing the MOSFET 160 conduction and switching losses, respectively. The product of these two metrics can be referred to as a figure-of-merit (FOM). The FOM for the flyback converter 100 can be given by:

$$FOM = Q_g \cdot R_{on} \propto V_{ds}^\beta = \left(\frac{V_p}{k} + n \cdot V_{out}\right)^\beta; \quad (2)$$

where Vds is the maximum blocking voltage, and β is a process dependant scaling factor (>2 for typical operation of the flyback converter 100).

Figure 5B:
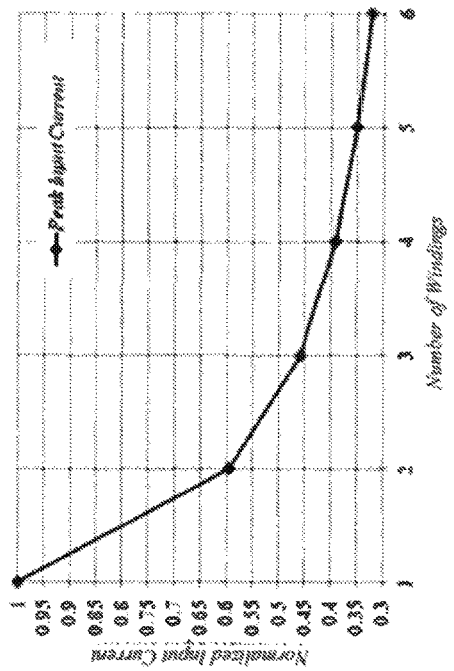
FIG. 5B is a graph of an exemplary curve showing a normalized switch loss as a function of a number of primary windings of a transformer.

From equation (2), it can be seen that a substantial reduction of the FOM is achievable through the addition of multiple primary windings 132, thus by increasing k. The effect of the reduction of the gate charge on the switching losses of the MOSFET 160 can be analyzed with the help of equation (3), presented hereinbelow, which describes the peak switching loss for typical AC-to-DC PFC application.

$$P_{sw}^{pk} \approx K_1 \cdot \frac{\left(\frac{V_p}{k} + n \cdot V_{out}\right) \cdot \frac{I_{pk}}{n} \cdot Q_g}{T_{sw}^{max}} = K_2 \cdot \frac{\frac{V_p}{k} + n \cdot V_{out}}{t_{on}} \cdot Q_g; \quad (3)$$

where K1 and K2 are process dependant constants. FIG. 5B is a graph of an exemplary curve showing a normalized switch loss as a function of the number of the primary windings 132 of the transformer 130 computed for typical operating conditions of the flyback converter 100, e.g. Vp=155V, Vout=12V, n=3, β=2.64, ton=constant, and PFE-Ton/Ron=constant. Referring to FIG. 5B, it can be seen that the reduction of the peak switching loss can be significant by simply adding a second primary winding 132. For applications with dominant switching losses, the reduction of the peak switching loss can enable a three times increase of the switching frequency, which can result in an additional three times reduction of reactive components (5.5 times total when combined with FIG. 5A).

Figure 5C:
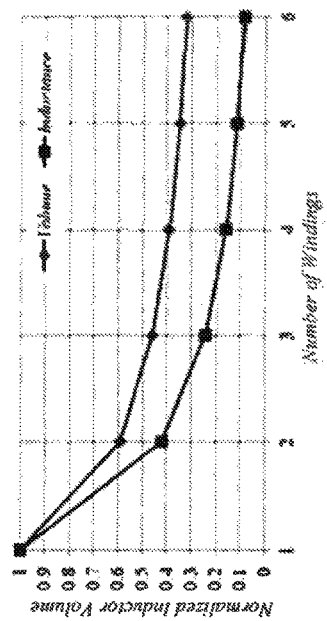
FIG. 5C is a graph of an exemplary curve showing a normalized conduction loss as a function of a number of primary windings of a transformer.

Moreover, the effect of the reduction of the on-resistance, Ron, on the peak conduction losses of the MOSFET 160 can be analyzed with the help of this equation:

$$P_{FET_{on}}^{pk} = I_{FET_{rms}}^2 \cdot R_{on} = K_3 \cdot \frac{\frac{V_p}{k} + n \cdot V_{out}}{\left(\frac{V_p}{k}\right)^2} \cdot R_{on}; \quad (4)$$

where K3 is a process dependant constant. In accordance with equation (4), FIG. 5C presents a graph of an exemplary curve showing a normalized conduction loss as a function of the number of the primary windings 132 of the transformer 130 using typical operating conditions, e.g. Vp=155V, Vout=12V, n=3, β=2.64, ton=constant, and Psw/Qg=constant. Referring to FIG. 5C, it can be seen that the reduction of the conduction losses is relatively constant for greater than two primary windings 132, which tends to be in the range of 40-50%.

The structure involving the plurality of primary windings 132 of the flyback converter 100 tends to reduce the input voltage linearly as a function of the number k of primary windings 132. Concurrently, in order to maintain energy conservation, the input current is amplified. As a result, the peak input current can be associated with an attenuated version of the magnetizing current, which can be given by:

$$I_{in}^{pk} = \frac{1}{k} \cdot I_{L_m}^{pk} = \frac{\pi \cdot P_{load}}{n \cdot V_{out}} \left(\frac{1}{k} + \frac{n \cdot V_{out}}{V_p}\right); \quad (5)$$

Figure 5D:
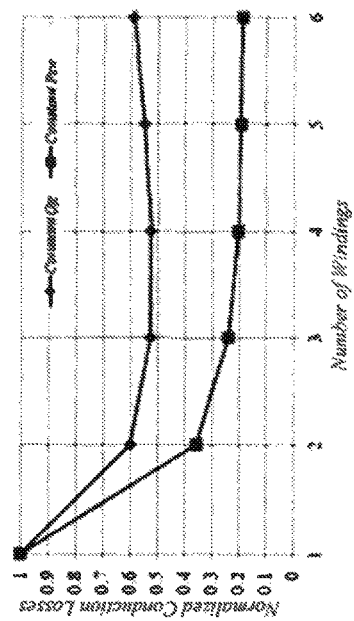
FIG. 5D is a graph of an exemplary curve showing a normalized peak input current as a function of a number of primary windings of a transformer.

Furthermore, the flyback converter 100 can be used to increase the switching frequency, while achieving lower switching losses, thus allowing the input current energy spectrum to be shifted to higher frequencies. The combined effect of the lower peak input current and higher frequency energy spectrum enable the volume of the EMI input filter 210 to be significantly reduced. FIG. 5D is a graph of an exemplary curve associated with equation (5) and showing a normalized peak input current as a function of the number k of primary windings 132 of a transformer 130 with the typical operating conditions. Referring to FIG. 5D, it can be seen that the normalized input current drops when using a transformer 130 having more than one primary windings 132 for a typical AC-to-DC PFC application.

As mentioned above, the flyback converter 100 allows for achieving a passive input capacitor voltage balancing. In order to minimize the maximum reverse voltage of the MOSFET 160, eliminate unstable voltage balancing runaway conditions and maximize the lifespan of batteries 410 (if used instead of the capacitive divider 120), it is desirable to maintain sharing of the voltage of the capacitive devices 122. As per its configuration, the flyback converter 100 tends to share the input voltage without requiring additional circuits, for instance. Accordingly, when a relatively large input voltage misbalance occurs, the misbalance can be automatically damped using the flyback converter 100 having a plurality of primary windings 132.

Figure 6:
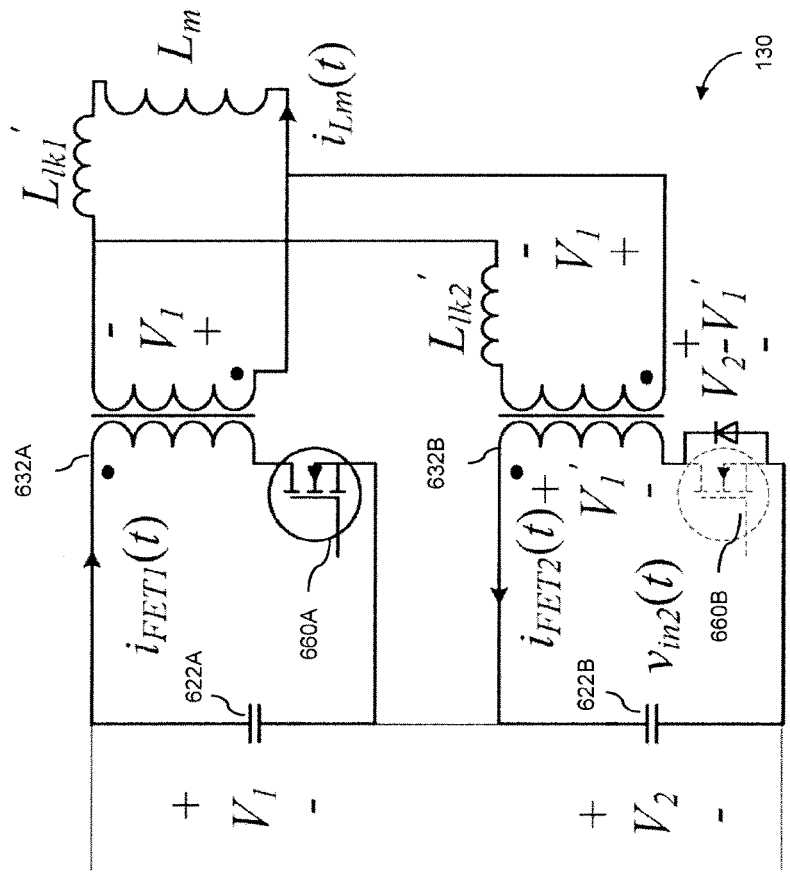
FIG. 6 is a schematic diagram of an example of a transformer of a flyback converter, in accordance with an embodiment.

FIG. 6 is a schematic diagram of the transformer 130 of the flyback converter 100 in order to illustrate how the balancing works. As depicted, the transformer 130 has first and second primary windings 632A, 632B, first and second capacitive devices 622A, 622B and first and second switching devices 660A, 660B. Accordingly, when the difference between the input voltage V1 of the first primary winding 632A and the input voltage V2 of the second primary winding 632B is sufficiently large to forward bias the body diode of the second switching device 660B, the second primary winding 632B typically begins to conduct current. This current flows into the second capacitive device 622B from the first capacitive device 622A, thus balancing the voltages. In other words, the input capacitor voltage balancing occurs when, for instance, the first switching device 660A is closed so that an electrical link is formed with the first primary winding 632A and to the associated capacitive device 622A. In this case, if the voltage V1 of the first capacitive device 622A is more than any other voltages of the capacitive devices, say V2, electrical charges will tend to be transferred from the first capacitive device 662A to the second capacitive device 622B via the transformer 130 and a body diode of the second switching device 660B. When the switching devices 660A and 660B are operated successively and repeatedly, such a voltage balancing across the first and second capacitive devices 622A and 622B can be achieved. It should be noted that due to the leakage inductance which tends to be present, the current typically has a sinusoidal shape, whose frequency is a function of the leakage inductance and capacitance values.

As for the snubber device 230, the flyback converter 100 allows energy transfer between the primary windings 132, as per the schematic diagrams described hereinabove. As a result, the single snubber device 230 connected to one of the primary windings 132 can clamp the drain-to-source voltage of the MOSFET 160 by ringing shortly after dis-engagement of MOSFET 160. Furthermore, when the transformer leakage inductances are relatively small, which can be the case, the maximum drain-to-source voltage values can approximately be the same.

Figure 7:
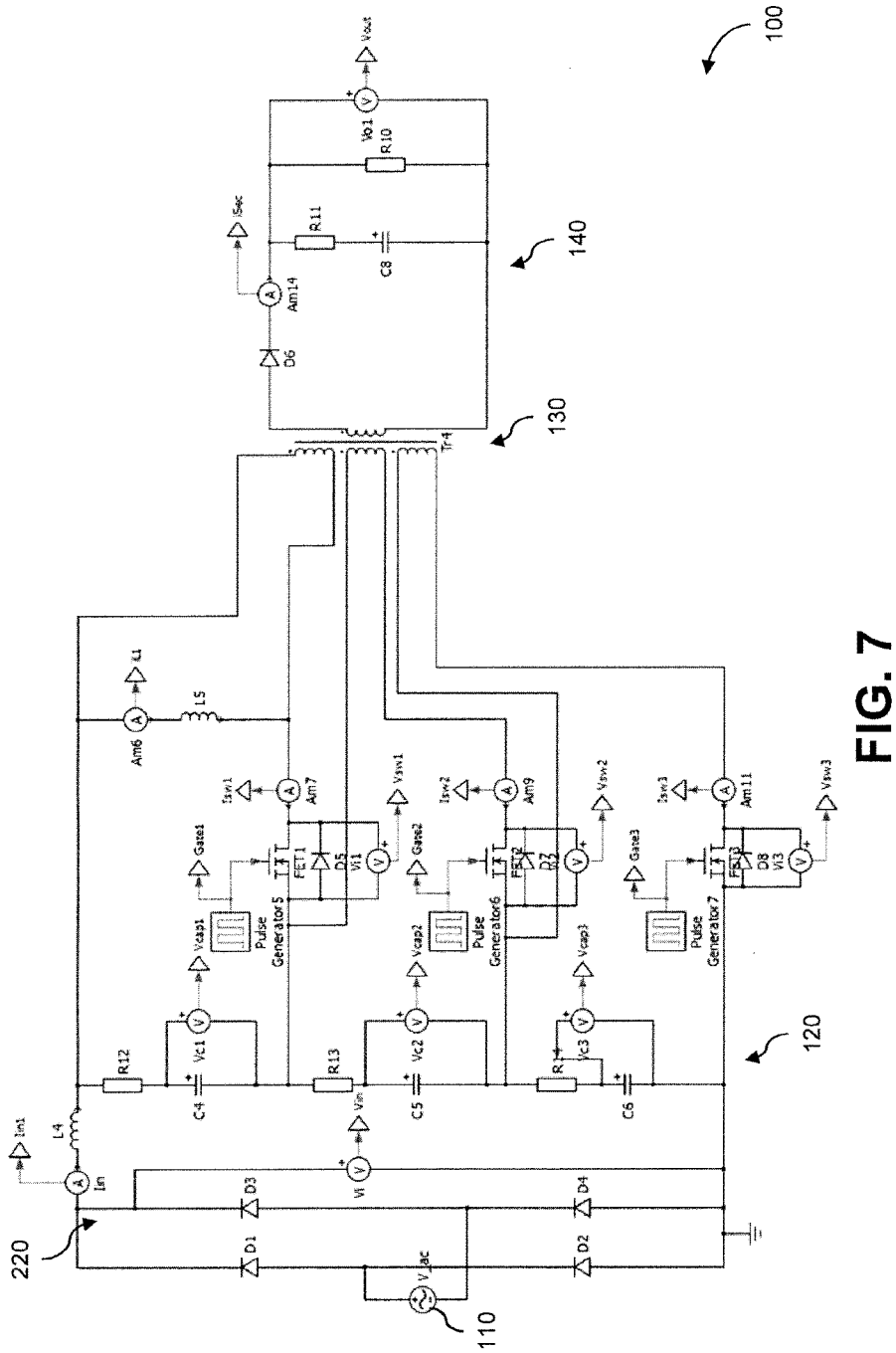
FIG. 7 is a schematic diagram of an example of a flyback converter, in accordance with an embodiment.

FIGS. 8A-9B present simulations comparing a conventional flyback converter having a single one primary winding to the flyback converter 100 having three primary windings 132, as depicted at FIG. 7. These simulations were processed using PLECS, a widely used simulation software for power electronics. These simulations were performed both to verify the performances of the flyback converter 100 and to these performances with the typical flyback converter having a single one primary winding. The parameters used for the following are summarized in Table 1.

TABLE 1

Parameters used for the simulations

| Parameters | Value |
| --- | --- |
| Peak Input Voltage (Vp) | 155 V |
| Output Voltage (Vout) | 12 V |
| Turns Ratio (n) | 3 |
| Load Power (Pload) | 100 W |
| Switching Frequency for the conventional flyback converter having a single primary winding | 100 KHz |
| Switching Frequency for the flyback converter 100 having three primary windings | 217 KHz |
| Magnetizing inductance for the conventional flyback converter having a single primary winding | 21 µH |
| Magnetizing inductance for the flyback converter 100 having three primary windings | 5 µH |

Figure 8B:
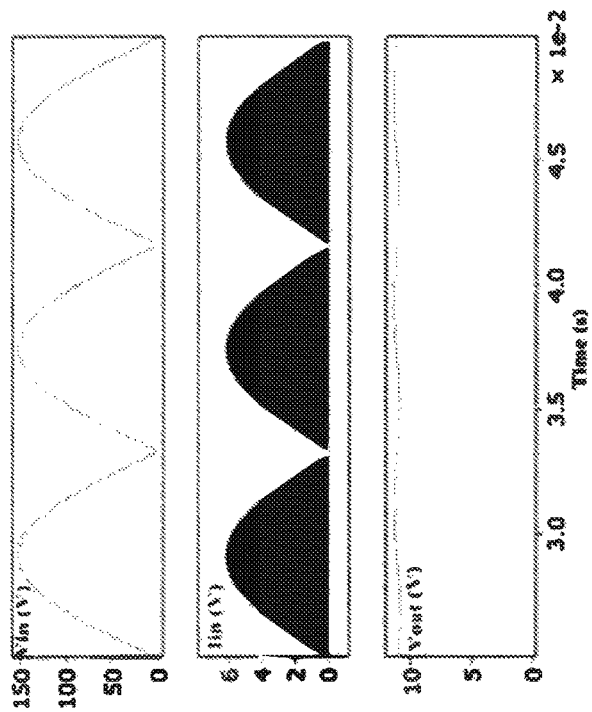
FIG. 8B is a graph showing the evolution of an input voltage, an input current and an output voltage as a function of time for the flyback converter of FIG. 6, in accordance with an embodiment.
Figure 8A:
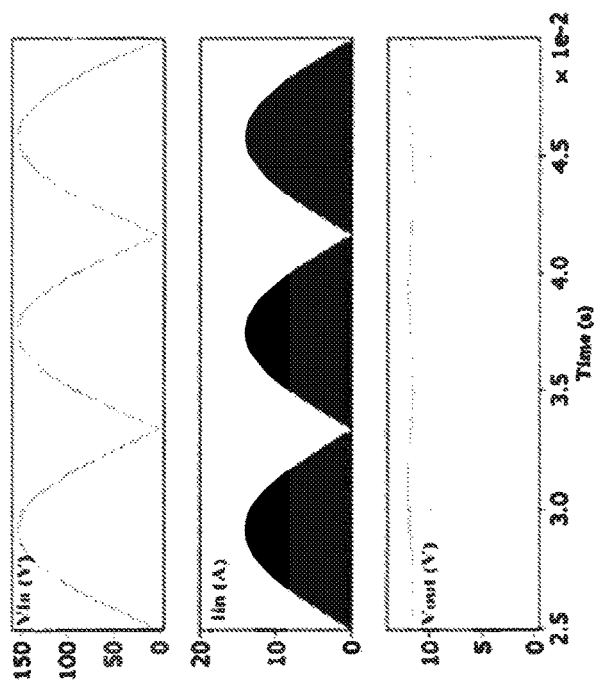
FIG. 8A is a graph showing the evolution of an input voltage, an input current and an output voltage as a function of time for the conventional flyback converter.

FIG. 8 show the evolution of the input voltage Vin, the input current Iin and the output voltage Vout as a function of time for the conventional flyback converter having a single primary winding in FIG. 8A and for the flyback converter 100 having three primary windings 132 in FIG. 8B in a typical AC-to-DC PFC application. As shown, the reduced input current peak, along with higher effective frequency allows significant reduction of the volume of the input filter 210, for instance, which can significantly reduce the overall volume of the flyback converter.

FIG. 9 show the evolution of the normalized switch gate voltage Gate_SW1, the magnetizing inductance current Ilm, the switch voltage Vsw1 and a switch current Isw1 for the conventional flyback converter having a single primary winding in FIG. 9A and for the flyback converter 100 having three primary windings 132 in FIG. 9B in a typical AC-to-DC PFC application.

A comparison of some parameters stems from theses simulations and are presented in Table 2.

TABLE 2

Comparison of parameters between the conventional flyback converter and the flyback converter of FIG. 7

| Parameters | Conventional flyback converter | Flyback converter having three primary windings | Difference [%] |
|---|---|---|---|
| Peak Mag. Ind. Current | 13.7 A | 18.9 A | +38 |
| Mag. Ind. Energy | 1970 mJ | 893 mJ | −55 |
| RMS Mag. Ind. Current | 7.9 A | 10.9 A | +38 |
| Voltage Rating of Sw | 191 V | 87.7 V | −54 |
| Norm. FOM (β = 2.64) | 1 | 0.13 | −87 |
| Peak Current of Sw | 13.7 A | 18.9 A | +38 |
| RMS Current of Sw | 3.4 A | 4 A | +18 |

One of the challenges for using the flyback converter 100 for AC-to-DC PFC applications is to meet electromagnetic interference (EMI) requirements. Indeed, flyback converters typically have discontinuous input currents, thus containing high frequency harmonics which tend to create EMI issues. These EMI issues become even more challenging for higher power applications where higher magnitudes of discontinuous input currents require bulky and expensive input filters to meet the EMI requirement. Indeed, these requirements often limit the use of flyback converters for AC-to-DC conversion with PFC application, despite of its convenient features such as inherent power factor correction in discontinuous conduction mode of operation. The effective higher switching frequency and reduced input current magnitude of the flyback converter 100 having multiple primary windings 132 allows significant reduction of the volume of the input filter 210 compared to conventional single winding flyback converters. Moreover, this can allow to extend the use of the flyback converter 100 beyond low/medium power levels.

Figure 10B:
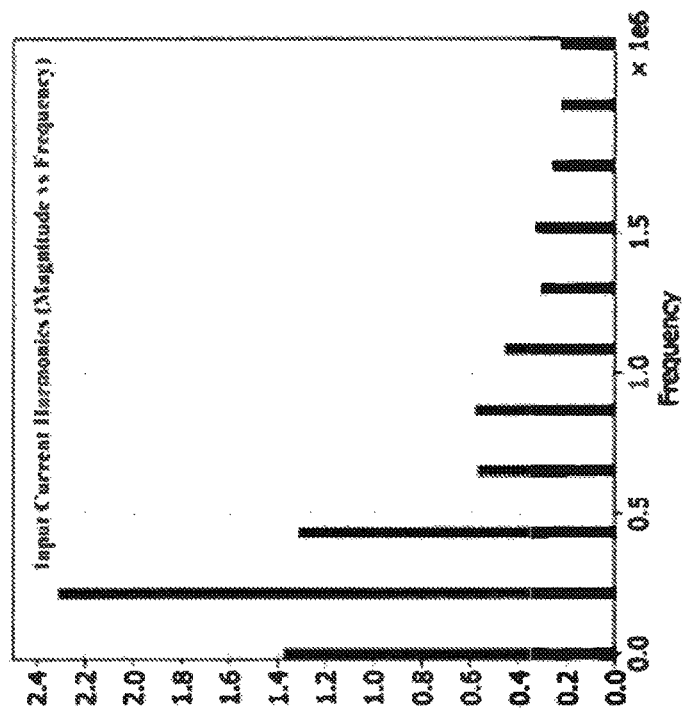
FIG. 10B is a graph showing a magnitude associated with input current harmonics for the flyback converter of FIG. 6, in accordance with an embodiment.
Figure 10A:
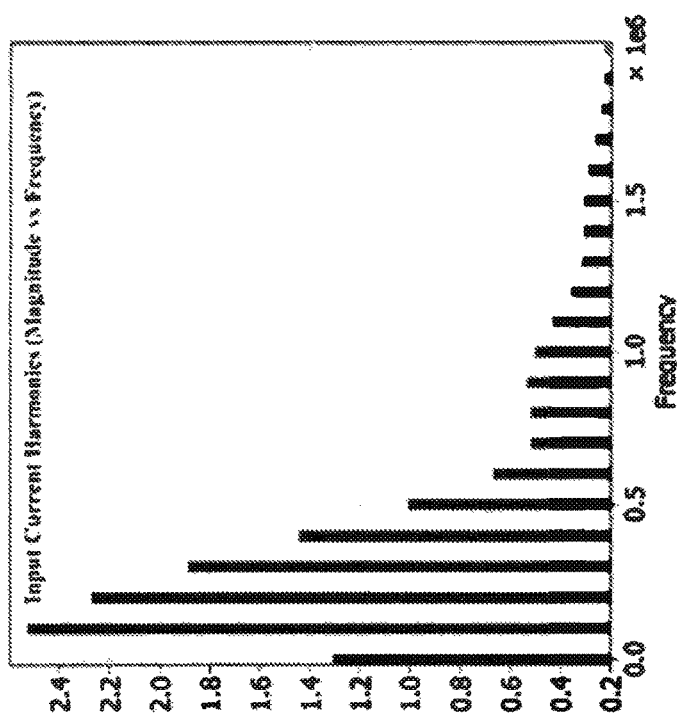
FIG. 10A is a graph showing a magnitude associated with input current harmonics for the conventional flyback converter.

FIG. 10A shows a graph of the magnitude associated with the input current harmonics for the conventional flyback converter whereas FIG. 10B shows a graph of the magnitude associated with the input current harmonics for the flyback converter 100 having three primary windings 132, as depicted in FIG. 7.

Compared to FIG. 10A, FIG. 10B has input current harmonics at higher than twice the frequency with reduced magnitude. This can allow for more the volume of the input filter 210 to be reduced a factor two due to the corner frequency of the input filter 210 tends to be proportional to the volume of the input filter 210. Moreover, reduction of switching losses shown in FIG. 5B can allow for operation of the flyback converter 100 at a higher switching frequency, allowing further reduction of the volume of both the input filter 210 and transformer 130.

Figure 11:
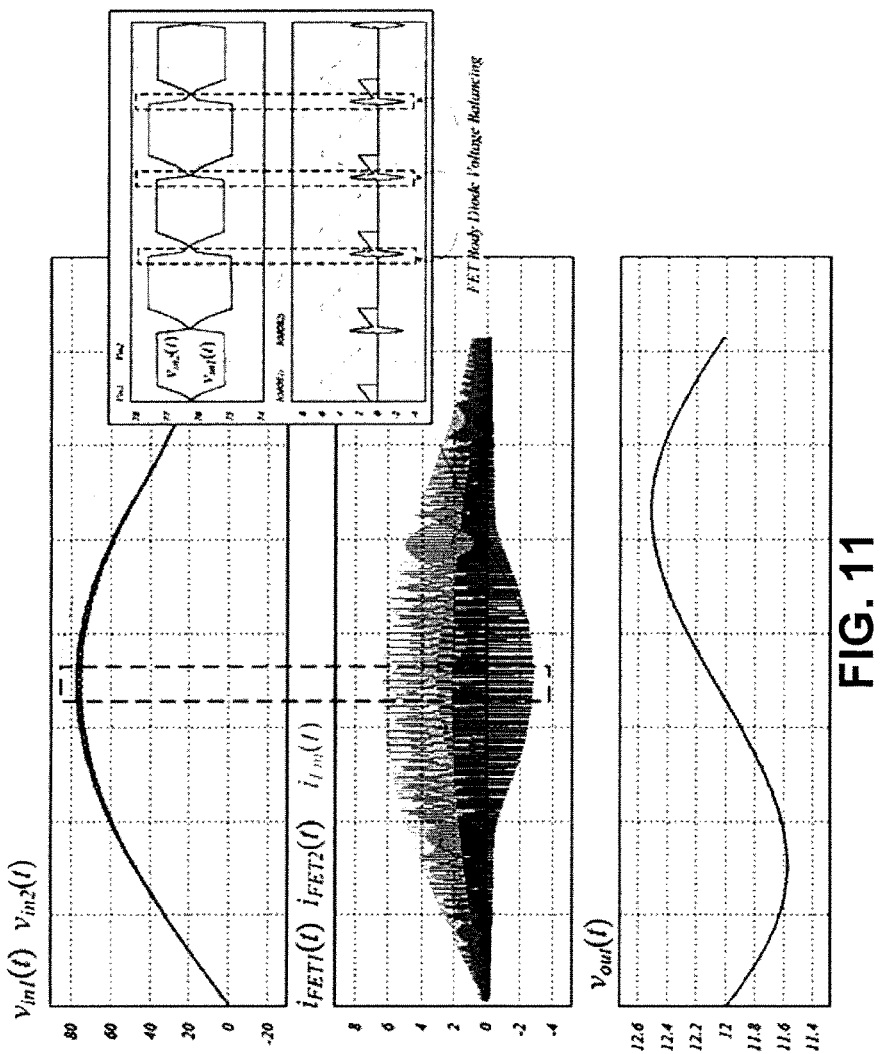
FIG. 11 is a graph showing the evolution of input voltages, switch currents, magnetizing inductance current and output voltage as a function of time for a flyback converter, in accordance with an embodiment.
Figure 12:
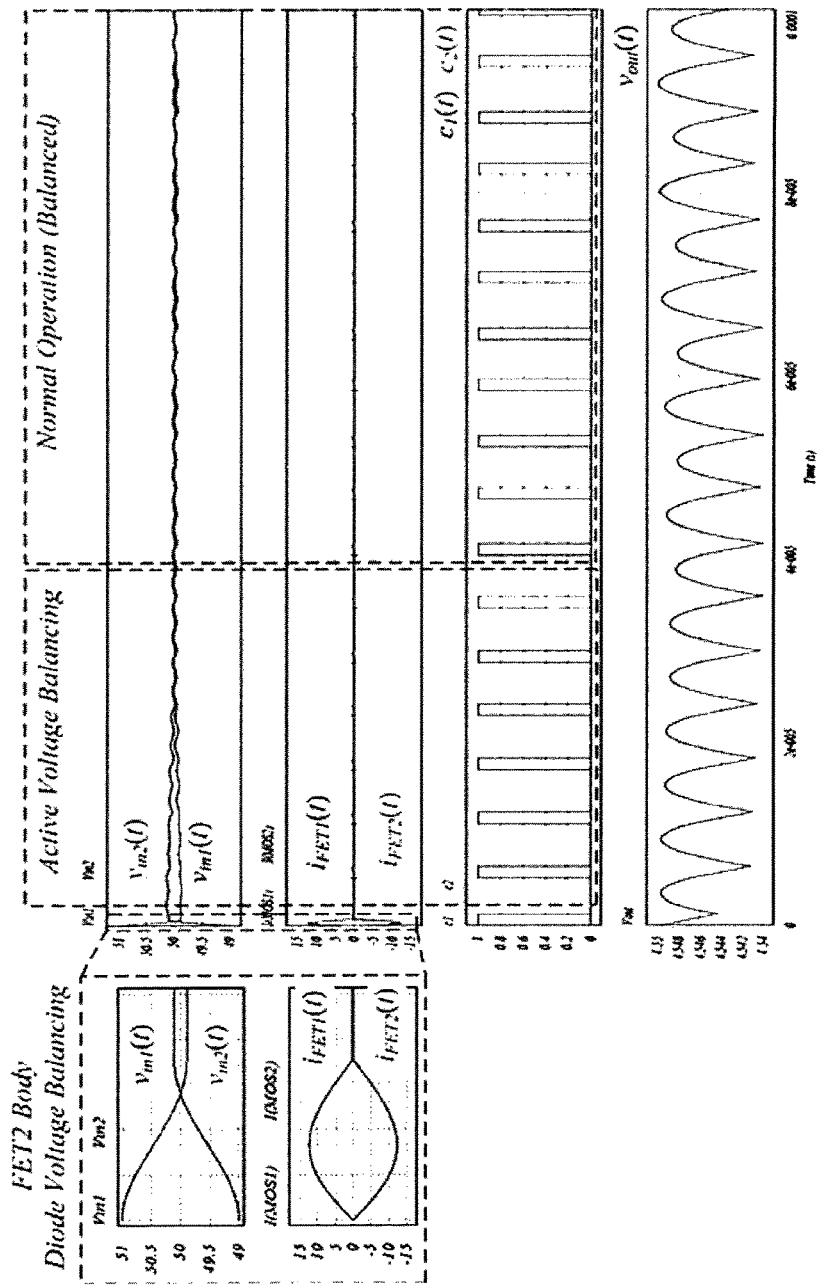
FIG. 12 is a graph showing a balancing phase and a balanced phase of the input voltages as a function of time, in accordance with an embodiment.

The following presents some graphs detailing the input capacitor/voltage cell balancing. Indeed, FIGS. 11 and 12 show graphs of the evolution of input voltages Vin1 and Vin2, switch currents $i_{FET1}$ and $i_{FET2}$, magnetizing inductance current $i_{Lm}$ and output voltage Vout as a function of time for the flyback converter 100. More specifically, FIG. 11 shows the input capacitor voltage balancing described above for a flyback converter 100 having two primary windings 132 for converting 110 Vrms-to-12 Vdc AC-to-DC while FIG. 12 shows the input capacitor voltage balancing for the flyback converter 100 having two primary windings 132 for converting 100 Vdc-to-4.5 Vdc DC-to-DC. It can be seen from these figures that active voltage balancing occurs in both cases.

As can be understood, the examples described above and illustrated are intended to be exemplary only. For instance, as may be readily understood by one skilled in the art, other embodiments of the flyback converter 100 can have more than one secondary winding. The term "a secondary winding" is thus used to refer to one secondary winding 134 as well as two, three or more secondary windings 134. These additional secondary windings 134 can be provided with associated biasing devices 142 and associated output capacitive devices 144 in order to power associated output loads 150. These can be useful for providing secondary power supplies (for example, to power USB devices, 5 V) at low cost. In addition, auxiliary windings can exist for other purposes such as powering up a controller circuit, sensing, storing of additional energy (for meeting hold up requirement). The scope is indicated by the appended claims.

Current Sensing

Flyback converters 100 rely on current sensing of one or more converter components, usually the switch 160 and/or inductive element 134, to regulate the output voltage and/or input current, improve power processing efficiency and to implement safety features (ie. over-current protection). Ideally, the number of current sensing circuits is limited to the bare minimum in order to decrease the bill-of-material, power losses and required printed circuit board (PCB) size, i.e. hardware complexity of the SMPS.

One of the challenges for using the embodied flyback converter 100 is the multitude of switching elements 160 for which a current sensor may be required, compared to the state-of-the-art single winding 132 and switch 160 flyback converter 100. In order to reduce the required number of current sensors to one, and the associated hardware complexity, the circuit shown in FIG. 13 can be used. It utilizes a small capacitive device 123 in parallel with the capacitive divider 120, and a low resistance current sensing resistor 152 to measure all of the switch 160 currents and the input current 210 (DC, FIG. 3)/220 (AC, FIG. 1/2).

Figure 13:
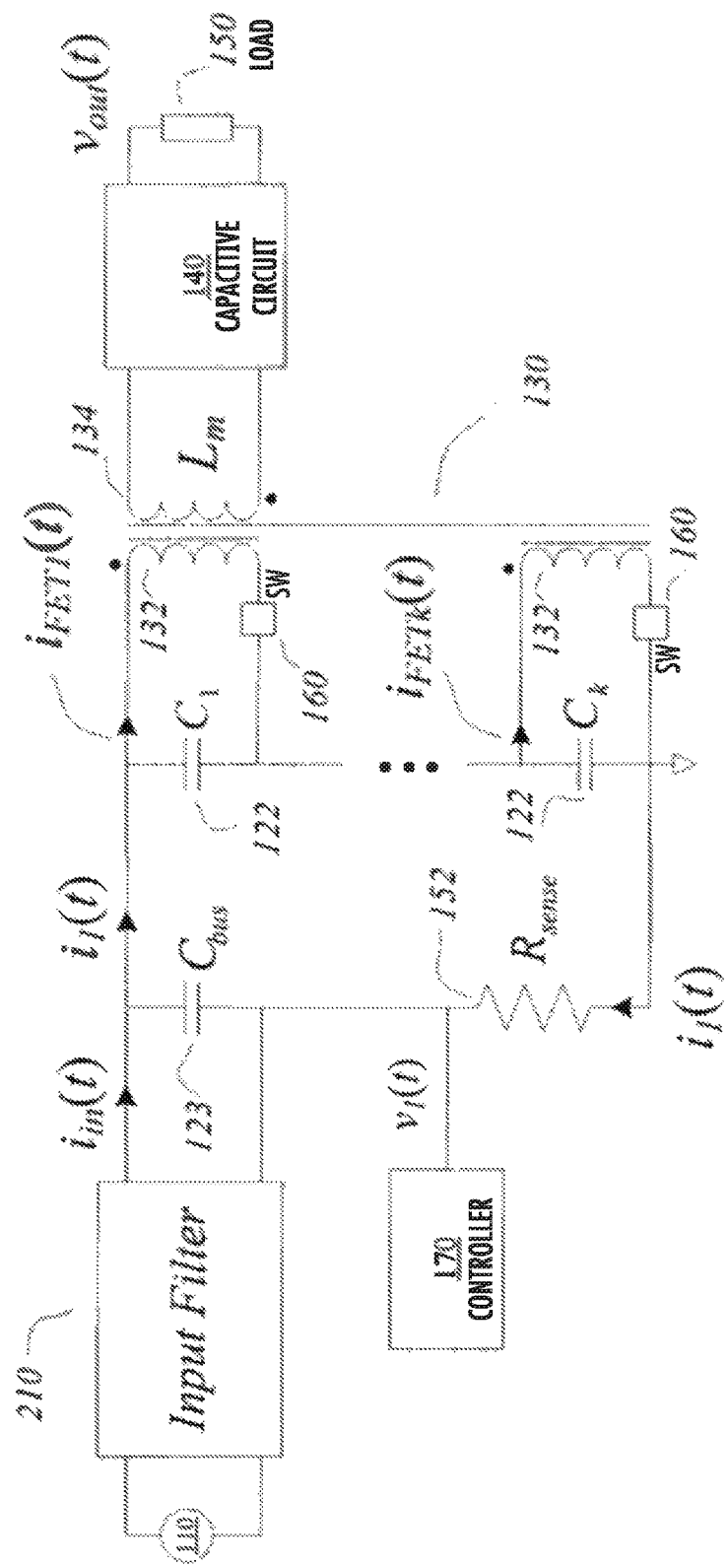
FIG. 13 is a schematic diagram of an example of a flyback converter utilizing a bus capacitor, 123, and sense resistor, 180, for current sensing, in accordance with an embodiment.
Figure 14:
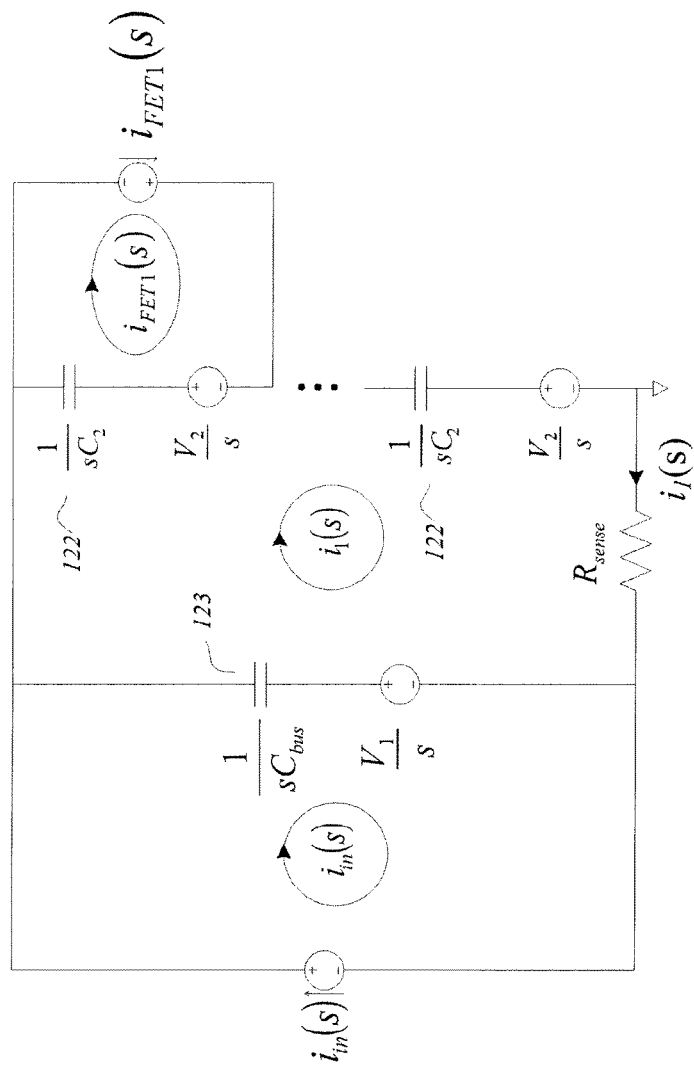
FIG. 14 is a schematic diagram of an equivalent circuit of a flyback converter with current sensing, ie.
Figure 15:
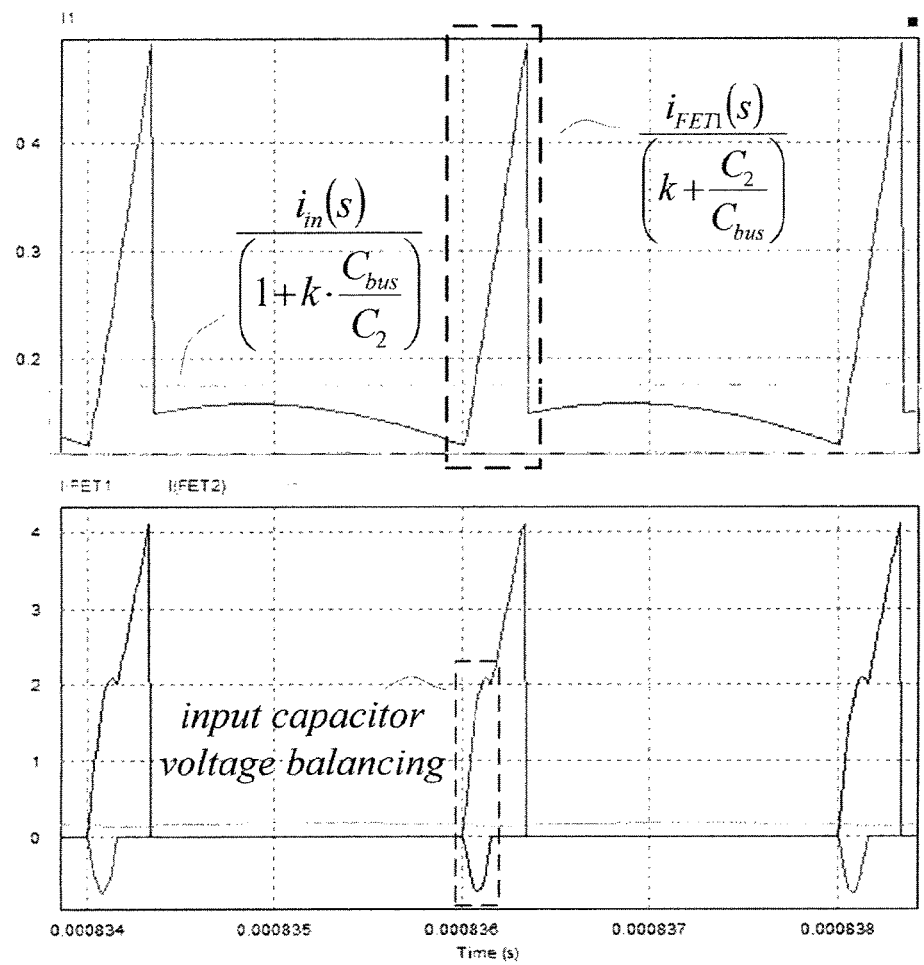
FIG. 15 is a graph showing the sensed current, i.e. the input current and switch current waveforms, of a simulated embodiment of FIG. 13.

By solving the equivalent circuit of FIG. 14, which captures the state of the flyback converter 100 and current sensor as shown in FIG. 13 at the moment when the first switch 160 is engaged (closed), it can be shown that the current through the sense resistor 152 is equal to $$i_1(s) \approx \frac{i_{FET1}(s)}{\left(k + \frac{C_2}{C_{bus}}\right)} + \frac{i_{in}(s)}{\left(1 + k \cdot \frac{C_{bus}}{C_2}\right)}, \quad (6)$$

where the first component is a scaled version of the current through the switch 160, high-frequency component, and the second component is a scaled version of the input current 210/220, low-frequency component. FIG. 15 shows the simulated currents of the circuit in FIG. 13 for the case where k=2, $C_{bus}$=0.1 μF and $C_2$=1 μF, verifying the principle of operation and ability of embodied current sensor to measure all switch 160 currents and the input currents 210 (DC, FIG. 3)/220 (AC, FIG. 1/2).

The sensed current is transformed into a voltage representation using the sense resistor 152, and fed into controller 170 for further signal processing required to implement voltage/current regulation, power processing efficiency improvements and over-current protection.

The preceding discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The invention is defined by the claims.

What is claimed is:

1. A flyback converter comprising:
   an input filter operatively connectable to a voltage source for receiving an input voltage and for providing a filtered input voltage;
   a capacitive divider operatively connected to the input filter for receiving the filtered input voltage, the capacitive divider having a plurality of first capacitive devices connected in series with one another;
   a transformer having a plurality of primary windings inductively coupled to at least one secondary winding, each one of the primary windings of the transformer being connected in parallel to a corresponding one of the first capacitive devices of the capacitive divider via a respective switching device, each of the at least one secondary winding being connected to a forwardly biased and capacitive circuit connectable to an output load;
   a controller connected to each one of the switching devices for operating the flyback converter to power the output load with the voltage source; and
   a current sensing circuit comprising a series combination of a second capacitive device and a sense resistor, the second capacitive device being connected in parallel across an output of the input filter, the series combination of the second capacitive device and the sense resistor being connected in parallel with the capacitive divider for measuring an input current of the flyback converter and current through each of the switching devices, and the measurement being utilized by the controller.

2. The flyback converter of claim 1, wherein the voltage source provides direct current (DC).

3. The flyback converter of claim 1, wherein at least one of the switching devices is at least one of a metal-oxide-semiconductor field-effect transistor (MOSFET), a bipolar junction transistors (BJTs) and an insulated-gate bipolar transistor (IGBTs).

4. The flyback converter of claim 1, wherein the switching devices are adapted to balance divided portions of the filtered input voltage among the plurality of first capacitive devices of the capacitive divider.

5. The flyback converter of claim 1, wherein one of the plurality of primary windings and of the at least one secondary winding has at least one of a snubber device, an active clamp or a soft-switching circuit for reducing a leakage voltage of the flyback converter.

6. The flyback converter of claim 1, wherein the voltage source provides alternating current (AC), the flyback converter further comprising a rectifier device connected, directly or indirectly, to the voltage source for providing a rectified input voltage to the capacitive divider.

7. The flyback converter of claim 1, wherein each one of the switching devices is connected in series with a corresponding one of the primary windings.

8. The flyback converter of claim 1, wherein the current sensing circuit provides instantaneous current information for all the switching devices and the input current, allowing for over-current protection and voltage/current regulation.

9. The flyback converter of claim 8, wherein the current sensing circuit provides instantaneous current information for all components connected to the first capacitive devices of the capacitive divider and the input current.

10. The flyback converter of claim 1, wherein the controller is configured to operate each one of the switching devices successively and repeatedly during normal use of the flyback converter.

11. The flyback converter of claim 10, wherein said operation of the switching devices balances voltages across each one of the first capacitive devices of the capacitive divider.

12. A method for operating a flyback converter that includes a transformer having a plurality of primary windings each being connected in parallel with a corresponding first capacitive device of a capacitive divider, the method comprising the steps of:
   providing a filtered input voltage to the capacitive divider from an input filter operatively connectable to a voltage source;
   sequentially operating each one of the primary windings using a portion of the filtered input voltage via the corresponding first capacitive device, each of the primary windings being coupled to a corresponding one of the first capacitive devices by a respective switching device;
   repeating the step of sequentially operating each one of the primary windings to generate an output voltage to an output load of the flyback converter; and
   measuring, by a current sensing circuit, an input current of the flyback converter and current through each of the switching devices, the current sensing circuit comprising a series combination of a second capacitive device and a sense resistor, the second capacitive device being connected in parallel across an output of the input filter, and the series combination of the second capacitive device and the sense resistor being connected in parallel with the capacitive divider.

13. The method of claim 12, wherein operation of the switching devices causes a balancing of the portion of the filtered input voltage across each one of the first capacitive devices.

14. The method of claim 12, wherein each of the primary windings is sequentially operated using the respective switching device connected in series with that primary winding.

15. The method of claim 12, further comprising limiting the portion of the filtered input voltage associated with one of the primary windings.

16. The method of claim 15, wherein said limiting is performed using at least one of a snubber device, an active clamp or a soft-switching circuit.

17. A flyback converter comprising:
- an input filter operatively connectable to a voltage source for receiving an input voltage and providing a filtered input voltage;
- a capacitive divider operatively connected to the input filter for receiving the filtered input voltage, the capacitive divider having a plurality of first capacitive devices connected in series with one another to produce a voltage drop across each one of said first capacitive devices;
- a transformer with a plurality of primary transformer windings, and a secondary output winding;
- a plurality of switches each for selectively interconnecting one of said primary transformer windings with one of said first capacitive devices to drive a load connected to said secondary output winding;
- a control circuit for operating said switches based on current through said switches; and
- a current sensing circuit comprising a series combination of a second capacitive device and a sense resistor, the second capacitive device being connected in parallel across an output of the input filter, the series combination of the second capacitive device and the sense resistor being connected in parallel with the capacitive divider for measuring an input current of the flyback converter and the current through said switches, and the measurement being utilized by the control circuit.

* * * * *